United States Patent [19]

Hoover et al.

[11] Patent Number: 5,042,418
[45] Date of Patent: Aug. 27, 1991

[54] FLAG DISPLAY DEVICE

[75] Inventors: Donald L. Hoover; Danny R. Lockman; Michael E. Newton, all of Gastonia, N.C.

[73] Assignee: Prideflags, Inc., Gastonia, N.C.

[21] Appl. No.: 493,891

[22] Filed: Mar. 15, 1990

[51] Int. Cl.⁵ .................. G09F 17/00; G09F 21/04
[52] U.S. Cl. .......................... 116/173; 116/DIG. 24; 116/28 R; 40/597; 40/591; 248/542
[58] Field of Search ............ 116/173, DIG. 24, 28 R, 116/174; 248/542, 543, 683, 603, 514; 40/592, 591, 597

[56] References Cited

U.S. PATENT DOCUMENTS

| 41,656 | 2/1864 | Watson . | |
| D. 204,727 | 5/1966 | Diehl | 40/592 |
| 661,643 | 11/1900 | Mowry | 116/173 |
| 914,775 | 3/1909 | Aarows | 116/DIG. 24 |
| 968,067 | 8/1910 | Mowry | 116/173 |
| 1,228,092 | 5/1917 | Brewer . | |
| 1,343,140 | 6/1920 | Keeley . | |
| 1,468,197 | 9/1923 | Downing | 116/DIG. 24 |
| 1,730,413 | 10/1929 | Easley . | |
| 2,069,942 | 2/1937 | Cohen | 116/DIG. 24 |
| 3,042,940 | 7/1962 | Keaton . | |
| 3,081,054 | 3/1963 | Westervelt | 116/DIG. 24 |
| 3,208,173 | 9/1965 | Shank | 116/28 R |
| 3,245,165 | 4/1966 | Podoloff | 40/591 |
| 3,273,118 | 9/1966 | Hendershot | 116/173 |
| 3,540,685 | 11/1970 | Gualano | 116/173 |
| 3,623,254 | 11/1971 | Parish Sr. . | |
| 3,715,821 | 2/1973 | Hawes | 116/173 |
| 3,788,269 | 1/1974 | Scarlet | 116/173 |
| 3,828,456 | 8/1974 | Rose | 40/592 |
| 3,910,226 | 10/1975 | McGahee | 116/173 |
| 3,924,344 | 12/1975 | Davis | 40/592 |
| 3,946,699 | 3/1976 | Mirshak | 116/174 |
| 3,948,205 | 4/1976 | Kortew | 116/173 |
| 3,968,977 | 7/1976 | Wilfert . | |
| 4,018,182 | 4/1977 | Knaack | 116/173 |
| 4,028,827 | 6/1977 | Hufton | 116/173 |
| 4,038,914 | 8/1977 | Crespo et al. | 248/346 |
| 4,158,925 | 6/1979 | Gagnon | 116/28 R |
| 4,163,426 | 8/1979 | O'Neill | 116/28 R |
| 4,375,134 | 3/1983 | Sheetz | 116/173 |
| 4,519,153 | 5/1985 | Moon et al. | 116/28 R |
| 4,590,883 | 5/1986 | Steed et al. | 116/173 |
| 4,650,147 | 3/1987 | Griffin | 116/28 R |
| 4,667,428 | 5/1987 | Elmer | 40/592 |
| 4,762,360 | 10/1973 | Hawes | 116/28 R |
| 4,805,550 | 2/1989 | Raczkowski et al. | 116/63 T |
| 4,813,369 | 3/1989 | Moreland | 116/173 |
| 4,860,476 | 8/1989 | Hall | 40/591 |
| 4,864,962 | 9/1989 | Kuehl et al. | 116/174 |

Primary Examiner—William A. Cuchlinski, Jr.
Assistant Examiner—C. W. Fulton
Attorney, Agent, or Firm—Bell, Seltzer, Park & Gibson

[57] ABSTRACT

A flag display device adapted to be mounted on the exterior of a vehicle or other object on which a flag may be displayed. The flag display device has a base, a plurality of spaced apart suction cups carried the base which are adapted to grip an exterior surface of the vehicle; a flagstaff; clips for attaching the flag to the flagstaff; and a mount for mounting the flag staff on the base and adjusting the angle of the flagstaff relative to the base so that the flag may be positioned at a desired angular attitude. The mount has a first toothed member integrally formed with the base which extends upwardly therefrom and having its teeth arranged on one side and projecting outwardly in a direction generally parallel to the base. A second toothed member is integrally formed with the lower end of the flagstaff so that its teeth intermesh with the teeth of the first toothed member. A fastener is also provided for maintaining the first and seocnd members in intermeshing relationship for obtaining the desired angular attitude of the flag.

4 Claims, 1 Drawing Sheet

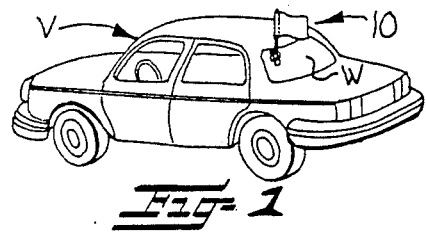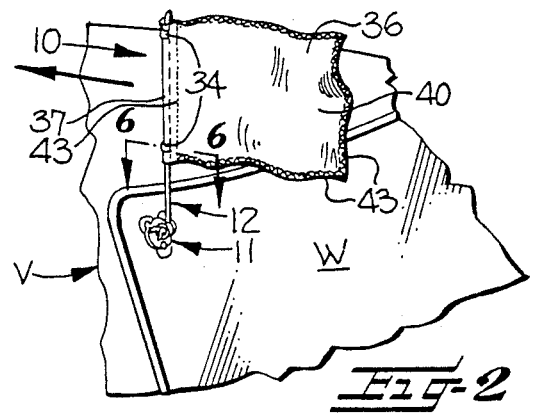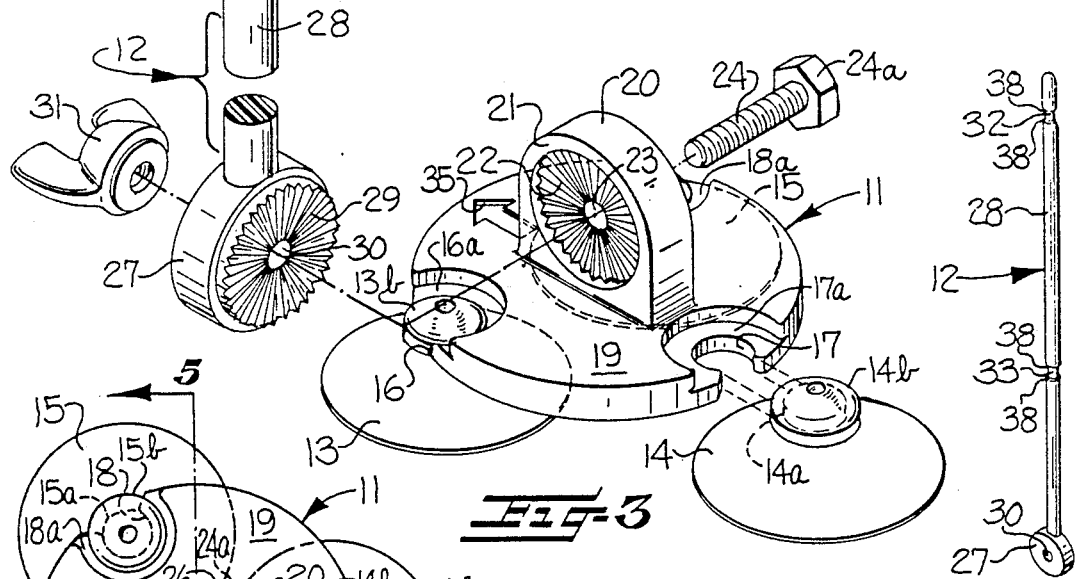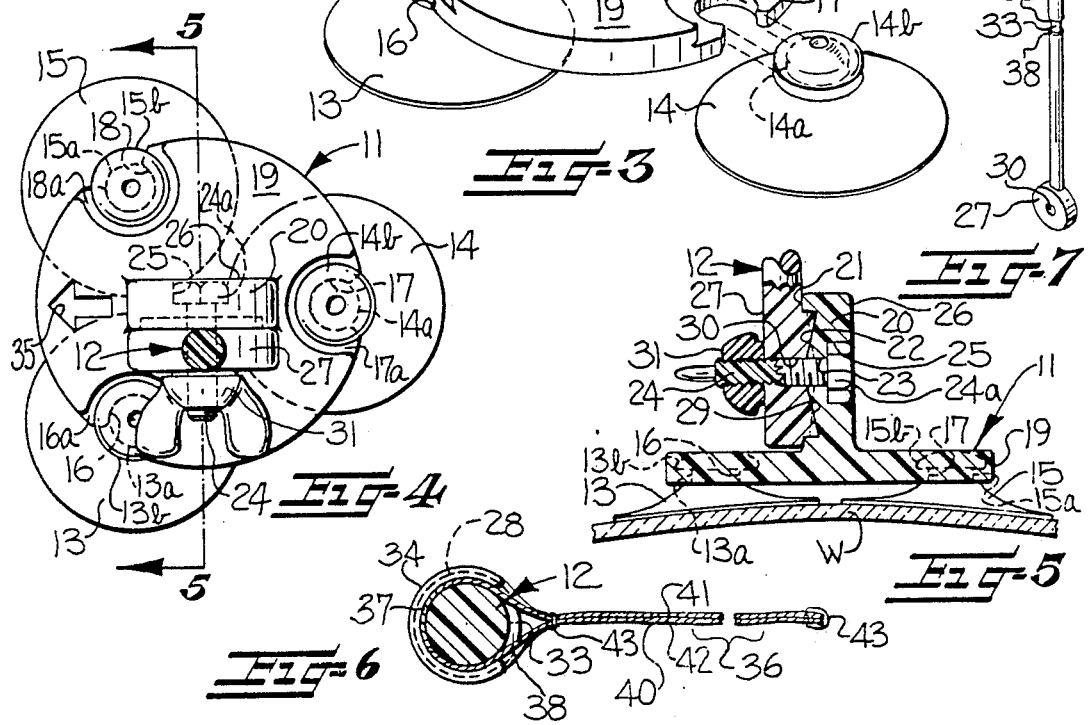

FLAG DISPLAY DEVICE

FIELD OF THE INVENTION

The present invention relates to devices for displaying flags, pennants, signs or other attachments from smooth surfaces, including the exterior body panels and windows of moving vehicles.

BACKGROUND OF THE INVENTION

Many persons desire to display flags temporarily in a variety of locations for decorative purposes, as symbols of allegiance, support or affiliation, or as means for commercial advertising. For example, athletic team enthusiasts, such as college or high school students, their parents and relatives, as well as other team supporters, often wish to display the symbol, name, mascot, or color of their school as an expression of allegiance and support. A prime opportunity for displaying a team's symbols occurs when supporters are traveling to and from athletic events in which their favorite team is playing. Other situations also occur in which a person may wish to display a flag. For example, pleasure boaters may wish to display a flag from their boat for decorative or identification purposes. A similar need exists for a flag display device adapted for rapid and simple installation and removal from commercial vehicles, such as those operated by pizza delivery companies. Likewise, it may be desirable to display a flag from a static location to decorate a room or house. Thus, a need has existed for an adaptable means for displaying flags from a variety of locations which may easily be affixed to or removed from a surface of a static or moveable object.

A wide variety of display devices, including decals, magnetic signs, posters and flags, have been used in the past to satisfy the aforementioned display needs. However, with regard to any flag display device that must be attached to the exterior of a moving vehicle, many problems arise as the flag display device must withstand prolonged and relatively severe stresses due to wind loading. These stresses are especially pronounced at the mounting base of the display device due to the drag that results from air flowing past the flag. This problem is compounded by the need of travelers to display flags on selected occasions only, thus necessitating that the flag display device be easily removable from the vehicle. To satisfy these needs, it is undesirable to provide a fixed mounting that could easily remain attached to the vehicle as it moves. Likewise, as it is desirable that the flag display device be capable of placement on a variety of locations without requiring alteration of the mounting surface, it is important that no fixed bracket attachment need be mounted to the vehicle surface. Heretofore, it has been difficult for a removable flag display device meeting the foregoing requirements to remain affixed to a vehicle surface while the vehicle is driven for a prolonged time at highway speeds.

Automobiles, boats and similar vehicles, as well as many static objects, may have great variation in shapes and sizes, as the exterior surfaces of such vehicles and objects may be comprised of a plurality of shaped surfaces. A person who wishes to display a flag from his vehicle may wish to select any number of these exterior surfaces as the mounting site for a flag. Such choices may be necessary to achieve optimum visibility or decorative effect, to prevent restricting the vision of the vehicle driver, or for some other reason of one's own devising. Similar decorative and functional choices arise when a flag is to be displayed from a static location. Consequently, it may be necessary to attach the flag display device to a horizontal, inclined, sloped or even vertical surface.

Because the angle of a surface determines the angle of the mounting base, it is desirable that the angle of the flagstaff be adjustable relative to the mounting base of the flag display device so that the flagstaff may be maintained in a desired orientation. In this way the flag attached thereto maybe displayed properly. For example, to ensure that the flag will be displayed ornamentally and that the design or message thereon may be seen clearly by all observers, some persons may wish that the flagstaff be positioned generally vertically so that the flag can open fully when the wind flows past it, as occurs when a vehicle on which the flag display device is mounted is in motion. Alternatively, if the flag is displayed from a static structure, such as a house window, it may be desireable that the flagstaff be situated essentially horizontally so that the body of the flag will drape downwardly, thus revealing the flag's message or symbol in a quiescent environment. As another example, persons who mount a flag on a vehicle may wish the flagstaff to slant slightly toward the rear of the vehicle so that the design of the flag displayed thereon will be visible when the vehicle is at rest. Many other variations in mounting preferences are readily apparent, and as a result, it is desirable that the flag display device have a flagstaff that may be adjusted over a wide range of angles to compensate for attachment of the display flag device to an inclined, horizontal or vertical surface to enable a user of the flag display device to position the flagstaff in some desired angular attitude.

Persons may frequently wish to display different flags on different occasions. For example, a supporter of a collegiate athletic team may wish to display his team's colors while traveling to and from a big game; however, at another time, he may wish to display some other design, such as the colors of a professional or high school sports team, an advertisement, or a fanciful design. Accordingly, it is desirable that the flag display device be adapted for interchangeably receiving and securely engaging a variety of flags.

Devices adapted for displaying a flag or sign from a staff mounted on the exterior of an automobile have been described in the following patents: Gualano, U.S. Pat. No. 3,540,685; Hawes, U.S. Pat. No. 3,715,821; Hawes, U.S. Pat. No. 3,762,360; Gagnon, U.S. Pat. No. 4,158,925; O'Neill, U.S. Pat. No. 4,163,126; Sheetz, U.S. Pat. No. 4,375,134; Moon, et al., U.S. Pat. No. 4,519,153; Steed, et al., U.S. Pat. No. 4,590,883; and Griffin, U.S. Pat. No. 4,650,147.

The Hawes '821 patent shows an assembly that is adapted for attaching a sign bearing staff to the exterior of a vehicle by securing a clamp to the upper edge of the generally vertical adjustable window on the side of a vehicle. This patent shows means for adjusting the angular attitude of the staff to compensate for the angular orientation of the car window. Likewise, the Hawes '360 patent shows an apparatus for attachment to the upper edge of a vehicle window which has a staff angle adjustment feature. The Gulano '685 patent shows a staff holder that attaches to the rain gutter of an automobile and which has a staff angle adjustment device. The Gagnon '925, O'Neill '426, Sheetz '134, Moon, et al, '153, Steed, et al. '883 and Griffin '147 patents likewise show flag or sign staff display devices adapted for grippingly engaging the upper edge of an adjustable side window on a vehicle. However, none of these patents show means for attaching the display device to the surface of a vehicle. The clamp attachment means shown in these patents limit those staffs to mounting on a vehicle at a limited number of points, namely, the upper edge of the side windows, except for the Gulano '685 patent, which shows a device limited to mounting on the rain gutter of a vehicle. Thus, the flag display devices in all of these patents except for the Gulano '685 patent present the distinct disadvantage that the window on which they are mounted cannot be rolled down without either releasing the display device from the window or impeding the visibility of the driver or other vehicle occupant. Thus, the use of these devices necessarily denies occupants of the vehicle's interior the convenience of rolling down the window to improve ventilation or of gaining access to the exterior of the vehicle without opening the car door. Further, these window mounted display devices present gaps above the window which create undesirable air whistling noises in the vehicle.

The following patents show means for removably attaching a flag or pennant to a flagstaff or similar device: Keeley, U.S. Pat. No. 1,343,140; Keaton, U.S. Pat. No. 3,042,940; Hawes, U.S. Pat. No. 3,715,821; Hawes, U.S. Pat. No. 3,762,360; Scarlet, U.S. Pat. No. 3,788,269; McGahee, U.S. Pat. No. 3,910,226; Knaack, U.S. Pat. No. 4,018,182; Hufton, U.S. Pat. No. 4,028,827; Sheetz, U.S. Pat. No. 4,375,134; Steed et al., U.S. Pat. No. 4,590,883; and Moreland, U.S. Pat. No. 4,813,369.

It is therefore an object of the present invention is to provide a flag display device capable of securely yet removably adhering to smooth surfaces, such as the body panels and windows of an automobile.

Another object of the present invention is to provide a flag display device on which flags may be quickly and easily interchanged.

Another object of the present invention is to provide a flag display device that includes means for quickly adjusting the angle of the flagstaff relative to the mounting base.

SUMMARY OF THE INVENTION

The invention comprises a flag display device adapted to be mounted on the exterior of a vehicle or other object from which a flag bearing a design, school colors, or advertisement may be displayed. The flag display device comprises a base, a plurality of spaced apart suction cups carried by the base which are adapted to grip an exterior surface of the vehicle; a flagstaff; means for attaching the flag to the flagstaff; and means for mounting the flagstaff on the base and adjusting the angle of the flagstaff relative to the base so that the flag may be positioned at a desired angular attitude. The mounting means has a first toothed member integrally formed with the base which extends upwardly therefrom and having its teeth arranged on one side and projecting outwardly in a direction generally parallel to the base. A second toothed member is integrally formed with the lower end of the flagstaff so that its teeth intermesh with the teeth of the first toothed member. Securing means is also provided for maintaining the first and second toothed members in intermeshing relationship for obtaining the desired angular attitude of the flag.

BRIEF DESCRIPTION OF THE DRAWINGS

The foregoing and other objects, advantages and features of the invention, and the manner in which the same are accomplished, will be more readily apparent upon consideration of the following detailed description of the invention taken in connection with the accompanying drawings, which illustrate preferred and exemplary embodiments, and wherein:

FIG. 1 is a perspective view of an automobile showing the flag display device in a typical mounting position;

FIG. 2 is a detailed view of the flag display device mounted on the rear window of the automobile as shown in FIG. 1;

FIG. 3 is an exploded view of the flag display device;

FIG. 4 is a top view of the flag display device;

FIG. 5 is a cross sectional view taken along lines 5—5 of FIG. 4;

FIG. 6 is a cross sectional view taken along lines 6—6 of FIG. 2; and

FIG. 7 is a perspective view of the flagstaff of the flag display device.

DESCRIPTION OF THE PREFERRED EMBODIMENT

Referring now to the drawings, FIGS. 1 and 2 show a flag display device broadly designated at 10 constructed in accordance with the principles of the present invention. The flag display device includes a base 11 and a flagstaff 12. Base 11 includes base portion 19 and first toothed member 20 formed integrally therewith. Base portion 19 of base 11 is surrounded by inwardly extending slots 16, 17 and 18 which are sized to receive and grip a plurality of spaced apart suction cups 13, 14 and 15 by engagement with integrally formed resilient neck portions 13a, 14a and 15a, respectively. The cross section of each resilient neck portion is greater than the width of each slot so that neck portions are frictionally gripped by the slots. Suction cups 13, 14 and 15 are arranged circularly in a generally parallel, coplanar orientation so that they may be fixedly adhered to any smooth, generally planar surface such as, for example, the body panel or window glass W of a vehicle V.

Base portion 19 further includes recesses 16a, 17a and 18a positioned concentric with slots 16, 17 and 18, respectively. Recesses 16a, 17a and 18a are sized to accept enlarged suction cup neck caps 13b, 14b and 15b so that they do not protrude above the upper surface of body portion 19.

Slots 16, 17 and 18 are equally spaced around the periphery of base portion 19. Directional indicia 35 is provided on base portion 19 to aid in the mounting of display device 10. Directional indicia 35 is positioned perpendicular to the plane formed by the concentric axes of suction cups 13 and 15. Thus, as best shown in FIG. 2, if directional indicia 35 is pointed in the direction of travel of a vehicle when the display device is mounted on a vehicle, the suction cups 13 and 15 will be oriented to provide greater adherence to the vehicle surface W at the front of base portion 19 in order to withstand tensile forces caused by wind resistance on display device 10. Because reduced support is required on the trailing side of flag display device 10, suction cup 14 is positioned in alignment with directional indicia 35 and first toothed member 20 to provide a central support in a trailing position on base portion 19.

The use of three suction cups 13, 14 and 15 instead of a greater or smaller number of cups permits clustering of suction cups 13, 14 and 15 to cover the largest possible portion of the area underlying base portion 19. It has been found that the use of three suction cups of about 1.5 inches in diameter placed 0.25 inches apart provides a satisfactory arrangement. Thus, secure engagement with a vehicle surface can be assured. Also, as shown in FIG. 5, the use of multiple suction cups facilitates compensation for curves in a window W or similar vehicle surface.

First toothed member 20 of base 11 extends generally perpendicularly from the upper surface of base portion 19. Side surfaces 21 and 26 of first toothed member 20 are parallel to the forward direction of base 11 as indicated by directional indicia 35. Hole 23 perforates first toothed member 20 and is perpendicular to side surfaces 21 and 26. A radiating series of teeth 22 are recessed within side surface 21 and extend concentrically from hole 23. Hole 23 is adapted to receive bolt 24, and hexagonal area 25 is recessed from side surface 26 of first toothed member 20 to engage head 24a of bolt 24 so that when bolt 24 is inserted into hole 23, head 24a and side surface 26 are approximately flush. The sides of hexagonal area 25 engage head 24a to prevent bolt 24 from rotating.

Flagstaff 12 includes second toothed member 27 and longitudinal staff 28. Hole 30 extends through engagement portion 27 so that second toothed member 27 is generally toroidal in shape. Teeth 29 extend outwardly from the side of second toothed member 27 and radiate concentrically from hole 30. In the preferred embodiment, second toothed member 27 and longitudinal staff 28 are integrally formed of a resilient plastic material as is base 11, including first toothed member 20.

Teeth 22 and 29 intermesh when they are brought together by placing first toothed member 20 and second toothed member 27 along side one another. As shown in FIGS. 4 and 5, when second toothed member 27 and first toothed member 20 are positioned so that teeth 22 and 29 intermesh, bolt 24 passes through holes 23 and 30 and further extends beyond second toothed member 27. Wing nut 31 engages the bolt 24 so that advancement of wing nut 31 along bolt 24 will compress first and second toothed members 20 and 27. This compression forces teeth 22 and 29 to remain in an intermeshing relationship, thereby adjustably maintaining the first and second toothed members 20 and 27 in intermeshing relation to restrain rotation of flagstaff 12 about the axis of bolt 24. Conversely, loosening of wing nut 31 on bolt 24 relaxes the compressive forces between teeth 22 and 29, thereby permitting the angular orientation of flagstaff 12 relative to base 11 to be changed.

In one embodiment, longitudinal staff 28 is approximately 12 inches long and has a diameter less than 0.5 inches, and preferably of approximately 0.375 inches. Longitudinal staff 28 is preferably made of a resilient material, for example a resilient plastic such as nylon, to absorb impacts or variations in loading caused by wind resistance on the flag display device. The upper portions of longitudinal staff 28 has a plurality of spaced apart areas of smaller cross section 32 and 33. Shoulders 38 are formed along each side of smaller cross sectional areas 32 and 33.

Flag 36 has tubular portion 37 along one side thereof. Tubular portion 37 is adapted to receive the upper portions of flagstaff 12. When flag 36 is positioned over flagstaff 12 as shown in FIG. 2, resilient clips 34 may be fitted over tubular portion 37 where it passes over areas of smaller cross section 32 and 33. When thus fitted, clips 34 restrain tubular portion 37 from moving longitudinally along flagstaff 12. Clips 34 are restrained from lateral motion along longitudinal staff 28 by engagement with shoulders 38, which have sufficient height to prevent clips 34 from sliding when flag 36 is placed between them as best shown in FIG. 6.

In a preferred embodiment, flag 36 is formed of a single piece of cloth that is folded over on itself to form tubular portion 37 and a body portion 40 of flag 36. Two cloth sides 41 and 42 are joined together by stitching 43 which extends around the three outermost edges of cloth sides 41 and 42 and between tubular portion 37 and body portion 40.

In the drawings and specification, there has been disclosed a preferred embodiment of the invention. Although specific terms have been employed, they have been used in a generic and descriptive sense only and not for purposes of limitation, the scope of the invention being set forth in the following claims.

That which is claimed is:

1. A flag which may display a school emblem or colors in combination with a display device therefor adapted to be mounted on the exterior of a vehicle for displaying said flag, said display device comprising a base, a plurality of spaced apart suction cups arranged in a cluster and carried by said base and depending therefrom and adapted to grip an exterior surface of the vehicle, a flagstaff, means for attaching said flag to said flagstaff, and means for mounting said flagstaff on said base and for adjusting the angle of said flagstaff relative to said base so that said flag may be positioned at a desired angular attitude, said mounting means comprising a first toothed member integrally formed with said base and extending upwardly therefrom with its teeth arranged on one side of the toothed member and projecting outwardly generally parallel to said base, a second toothed member integrally formed with a lower end of said flagstaff and having its teeth intermeshing with the teeth of said first toothed member, and securing means for adjustably maintaining said first and second toothed members in intermeshing relation for obtaining the desired angular attitude of said flag, the cluster arrangement of said suction cups being such that the centerpoints of said suction cups define an imaginary polygon around said flagstaff mounting means and the lower end of said flagstaff, said base having readily viewable directional indicia on an upper surface thereof for indicating the proper directional mounting of the base on a vehicle.

2. A flag which may display a school emblem or colors in combination with a display device therefor adapted to be mounted on the exterior of a vehicle for displaying said flag, said display device comprising a base, a plurality of spaced apart suction cups carried by said base and depending therefrom and adapted to grip an exterior surface of the vehicle, a flagstaff, means for attaching said flag to said flagstaff, and means for mounting said flagstaff on said base and for adjusting the angle of said flagstaff relative to said base so that said flag may be positioned at a desired angular attitude, said mounting means comprising a first toothed member integrally formed with said base and extending upwardly therefrom with its teeth arranged on one side of the toothed member and projecting outwardly generally parallel to said base, a second toothed member integrally formed with a lower end of said flagstaff and having its teeth intermeshing with the teeth of said first toothed member, securing means for adjustably maintaining said first and second toothed members in intermeshing relation for obtaining the desired angular attitude of said flag and wherein said base has readily viewable directional indicia on an upper surface thereof for indicating the proper directional mounting of the base on a vehicle, and wherein said suction cups are three in number with two of the suction cups forwardly arranged on said base with said directional indicia therebetween, and wherein the remaining suction cup is arranged in a trailing position on said base.

3. A display device adapted to be mounted on the exterior of a vehicle for displaying a flag, said display device comprising a base, a plurality of spaced apart suction cups carried by said base and depending therefrom and adapted to grip an exterior surface of the vehicle, a flagstaff, and means for mounting said flagstaff on said base and for adjusting the angle of said flagstaff relative to said base so that a flag when carried by said flagstaff may be positioned at a desired angular attitude, said means comprising a first toothed member connected to said base and extending upwardly therefrom with its teeth arranged on one side of the toothed member and projecting outwardly generally parallel to said base, a second toothed member connected to a lower end of said flagstaff and having its teeth intermeshing with the teeth of said first toothed member, securing means for adjustably maintaining said first and second toothed members in intermeshing relation and wherein said base has readily viewable directional indicia on an upper surface thereof for indicating the proper directional mounting of the base on a vehicle, and wherein said suction cups are substantially coplanar and are three in number with two of the suction cups arranged forwardly on said base with said directional indicia therebetween, and wherein the remaining suction cup is arranged in a trailing position on said base.

4. A display device adapted to be mounted on the exterior of a vehicle for displaying a flag, said display device comprising a base, a plurality of spaced apart suction cups carried by said base and depending therefrom and adapted to grip an exterior surface of the vehicle, a flagstaff, and means for mounting said flagstaff on said base and for adjusting the angle of said flagstaff relative to said base so that a flag when carried by said flagstaff may be positioned at a desired angular attitude, said means comprising a first toothed member connected to said base and extending upwardly therefrom with its teeth arranged on one side of the toothed member and projecting outwardly generally parallel to said base, a second toothed member connected to a lower end of said flagstaff and having its teeth intermeshing with the teeth of said first toothed member, securing means for adjustably maintaining said first and second toothed members in intermeshing relation and wherein said base has readily viewable directional indicia on an upper surface thereof for indicating the proper directional mounting of the base on a vehicle, said directional indicia being arranged generally at right angles to said securing means for said first and second toothed members, and wherein two of said plurality of suction cups are carried by said base forwardly of said securing means and on opposite sides of said directional indicia, and another of said plurality of suction cups is carried by said base in a trailing position behind said securing means.

* * * * *